United States Patent Office 3,315,399
Patented Apr. 25, 1967

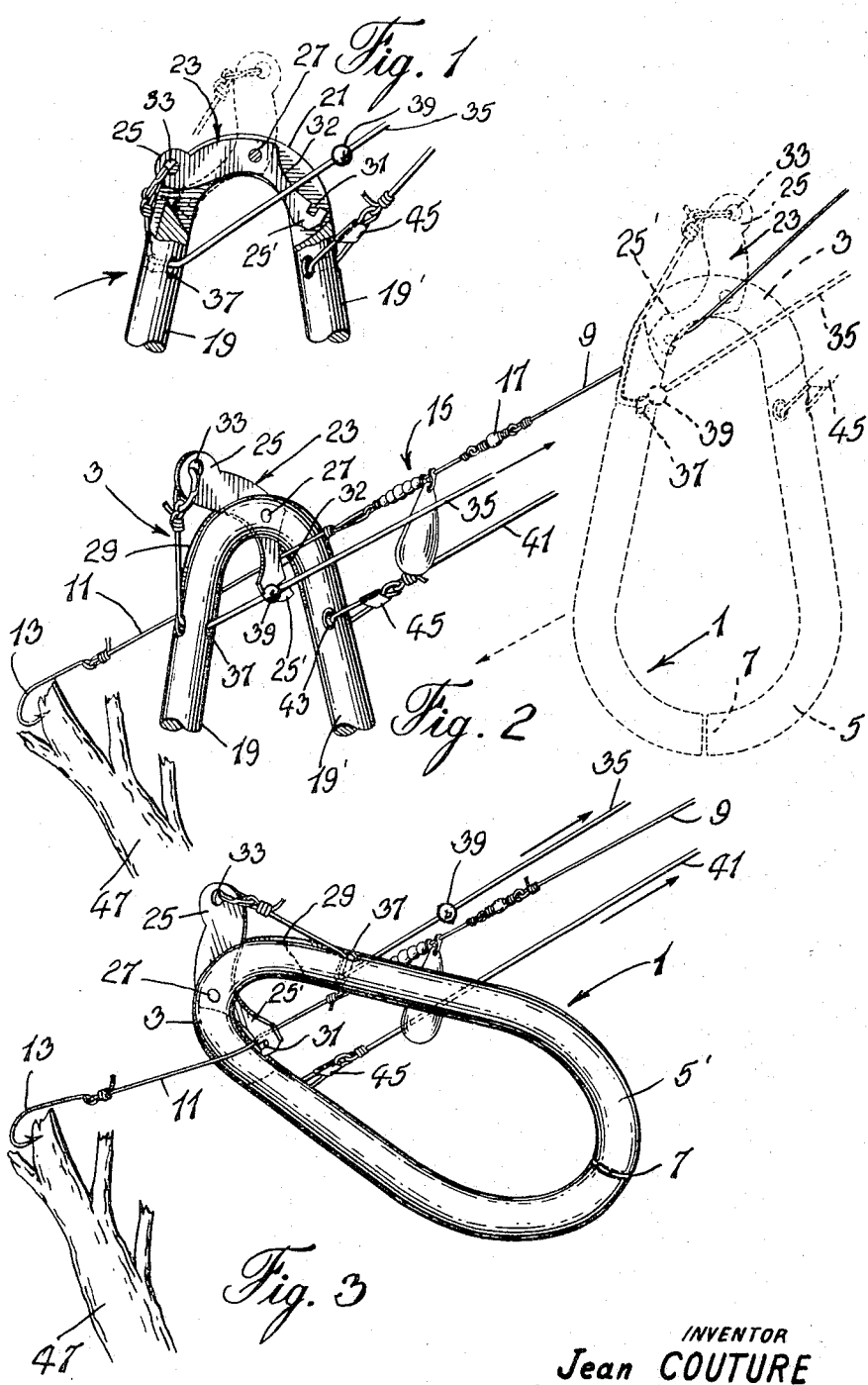

3,315,399
FISHING LURE RETRIEVER
Jean Couture, 305 Angers St., Jonquiere,
Lapointe County, Quebec, Canada
Filed Nov. 4, 1964, Ser. No. 408,779
4 Claims. (Cl. 43—17.2)

The present invention relates to a device for retrieving the fishing lure of a fishing line and generally any fishing implements located behind the fishing hook when the latter has become snagged on an underwater obstruction.

Several such devices have been proposed in the past based upon the principle of striking repeated blows against the lure itself in an attempt to pry the snagged hook loose from the obstacle. The major disadvantage of such devices is that they are usually inefficient in use since it cannot be ascertained at what location on the lure or other similar instrumentality the blow is to be struck in order to succeed in freeing the hook and, in many instances, the blows are practically useless in achieving their end. Other devices have been suggested wherein an attempt is made to tightly grasp the fishing line as close as possible to the snagged hook and then pulling on the retriever to pry the hook loose. However, such devices are also inefficient in that if the hook is well snagged, the devices tend to slip along the line rather than pull.

It is consequently a major object of the invention to provide a fishing lure retriever which is manually operated and adapted to positively grasp the line as near as possible to the caught hook to release the latter when pulled, whereby to save the more expensive parts of the fishing line, that is, the luring devices, and should the hook be so firmly snagged, to retrieve at least the line and the luring devices.

Another object of the invention is to provide a fishing lure retriever of the above type which increases the gripping action on the line as the pulling force acting thereon is increased whereby the firmer the snagging of the hook, the firmer is the grip on the line which eventually leads to either releasing of the hook or breaking of the line but at a point close to the hook, thus allowing to save the luring equipment and the line.

Still, another object of the invention resides in the provision of a fishing lure retriever that is simple in construction and thus can be manufactured at such low cost as to be available to any fisherman.

In the following specification, the term "lure" should be interpreted to mean any devices connected at the hook ed of a fishing line and including any fish lures, sinkers and other such devices.

The above noted objects may be obtained with a fishing lure retriever made according to the invention which comprises a weighted body capable of sinking in water and including a U-shaped part having a first and a second leg spaced from one another and connected by an arcuate piece; a two-arm lever mounted on said bottom piece and rotatable about an axis normal to the plane of said U-shaped part; pull-line means including a pull-line connected at one end to an arm of said lever to cause rotation thereof to draw the other arm nearer the second leg.

In a preferred embodiment of the invention, the pull-line means includes a guiding passage across the first leg of the U-shaped part through which said pull-line extends and said lever is a bell-crank lever having a pair of angularly disposed arms and a fulcrum at the apex thereof mounting the lever on the arcuate piece for rotation of the lever about an axis normal to the general plane of said U-shaped part, as aforesaid.

Still in the preferred form of the invention, a fishing line catching hook is formed at the end of the arm of the lever not secured with a pull-line, the hook having the shape of a notch opening toward the second leg of said U-shaped part.

Finally, the invention preferably contemplates the provision of a ball having a diameter greater than the passage across the first leg, through which the pull-line extends, the said ball being secured to the pull-line at a distance such, from the end of the pull-line connected to the lever, that in inoperative position when the hook end of the lever is rotated toward the first leg, the line joining the two free ends of the arms of the lever is on the side of the fulcrum facing the pull-line between the connected end thereof and the ball.

A better understanding of the invention will be afforded by the following description having reference to the appended drawing wherein:

FIG. 1 is a view in elevation, with parts shown in cross section, of the upper U-shaped part of the retriever;

FIG. 2 is a view in perspective of the U-shaped part of the retriever of the invention as shown in use over a snagged line; the line gripping lever being shown in inoperative position;

FIGURE 3 is a perspective view similar to that of FIGURE 2, wherein the line gripping lever is shown in operative position with the pull-line and guide line being pulled to retrieve the lure and fish line.

The retriever of the invention is a weighted body, preferably made of non-corrosive metal, and capable of sinking in water. In the preferred form of the invention, the retriever 1 is a pear-shaped member made of copper or other sinkable non-rusting material and is preferably circular in cross-section, in the shape of a bent rod. Consequently, and as best shown in FIGURES 2 and 3, retriever 1 comprises an upper U-shaped part 3 and a lower U-shaped part 5, the latter having a transverse slot 7 which is of course necessary to allow passage of a fish line such as 9. The latter comprises the conventional line 9 itself, usually made of nylon or similar material, and a leader 11, often made of metal and normally stronger than the fish line 9 proper. A fish hook 13 is of course provided at one end of the leader 11 while the lure 15 is interposed between the other end of the leader 11 and the line 9 proper with a universal connection such as 17 being provided between the line 9 and lure 15 to allow relative rotation between leader 11 and the fish line 9.

The upper U-shaped part 3 has a pair of spaced legs comprising a first leg 19 and a second leg 19' connected by an arcuate piece 21, the latter merging into legs 19, 19'.

A two-arm lever 23, preferably a bell-crank lever having a pair of angularly disposed arms 25, 25', is mounted, substantially centrally of the arcuate piece 21, for pivotal movement through a fulcrum 27 provided at the apex of the lever. It will have been noted that arcuate piece 21 is formed with a through slot 29 (see FIGURES 2 and 3) extending centrally longitudinally thereof. Consequently, lever 23 is mounted in said slot with the fulcrum 27 secured to the parts of the arcuate piece 21 on each side of slot 29. Thus, the lever is mounted for rotation about an axis normal to the general plane of the upper U-shaped part.

Arm 25' of lever 23 is formed with a fishing line catching hook 31 in the shape of a notch opening toward second leg 19' of U-shaped part 3. It will be noted also that the corresponding edge 32 of the said arm 25' between the fulcrum 27 and hook 31 is concave.

The other arm 25 of lever 23 has a hole 33 through the outer end thereof for the attachment of one end of a pull-line 35, the latter also extending through a passage 37 provided across first leg 19 of U-shaped part 3. A ball 39 is fixed to pull-line 35 at a distance from the connected end thereof for a purpose to be determined later. It will be noted that ball 39 has a diameter greater than passage 37 through first leg 19.

A guide line 41 is connected to second leg 19' through an aperture 43 therethrough, and by any known means 45.

As mentioned previously, the line gripping lever 23 is preferably a bell-crank lever and it will be noted that the line joining the two free ends of arms 25, 25' is constantly on the side of the fulcrum 27 facing passage 37 and, in one extreme case, the said line is nearly in alignment with the said passage 37 (see the dotted position of FIG. 2). This is insured by proper positioning of ball 39 and is intended to prevent overturning of lever 23 which would cause the pull-line 35 to wind around fulcrum 27 or would at least cause hole 33 to overpass fulcrum 27 in relation to passage 37, thus rendering the said lever inoperative. It is believed that this can be understood clearly from the dotted outline of FIGURE 2.

The operation of the retriever is as follows:

Assuming that hook 13 has become snagged in an underwater obstacle such as 47, fish line 9 is inserted into the pear-shaped body 1 by slipping through slot 7. Then by holding on to guide line 41, body 1 is let down slowly (as shown in dotted outline in FIGURE 2) until it reaches the obstacle 47. During that time, pull-line 35 is loosely held so that the pull caused by the weight of body 1 will force arm 25', of the line gripping lever, completely into slot 29. As explained previously, lever 23 cannot rotate clockwise any further due to the obstruction caused by ball 39 as it reaches passage 37.

Body 1 will be course stop riding the line when it reaches obstacle 47 and at that moment, pull-line 35 is drawn while guide line 41 is released. This will cause gradual rotation of lever 23, as shown in FIGURE 2, and also pivoting of body 1 upon itself as shown in FIGURE 3. Arm 25' draws nearer second leg 19' carrying with it fishing line 9 or more precisely leader 11 which tends to remain at the arcuate piece of the U-shaped part 3 because of the weight of body 1. Further pull on line 35 will securely grip leader 11 between the arcuate edge 32 of arm 25' and second leg 19' or more precisely slot 29. In fact, the tendency will be to draw the said line 9 into the slot thus affording a secure holding of leader 11. A strong pull is thereafter applied to lines 35 and 41 to force release of the hook 13 from the obstacle 47 or breaking of the leader 11 at a location between the hook 13 and the retriever 1. It may also happen, if the leader is quite strong, that hook 13 be bent out of attachment with obstacle 47.

In order to prevent slipping of leader 11 between edge 32 of arm 25' and the corresponding second leg 19', the said arm 25' is provided, as aforesaid, with a groove or hook 31 into which leader 11 tends to slip due to the curve in edge 32. By this action, the said arm 25' would enter slot 29 and thus considerably increase the holding power on leader 11.

Although a specific embodiment has just been described, it will be understood that various modifications may be made thereto without departing from the spirit of the invention, the scope of which is set forth in the appended claims.

I claim:
1. A fishing lure retriever comprising:
 (a) a weighted body capable of sinking in water and including a U-shaped part having a first and a second leg spaced from one another and connected by an arcuate piece merging into said legs;
 (b) said piece being formed with a through slot extending centrally longitudinally thereof;
 (c) a bell-crank lever having a pair of angularly disposed arms and a fulcrum at the apex thereof mounting said lever substantially centrally of said piece and in said slot for rotation of the lever about an axis normal to the general plane of said U-shaped part;
 (d) said first leg having a guiding passage therethrough;
 (e) a pull-line extending across said guiding passage and connected to the free end of one of said arms whereby, when said pull-line is pulled, said lever is rotated and the other arm of said pair is drawn nearer the second leg;
 (f) a fishing line catching hook formed at the end of said other arm of said pair in the shape of a notch opening toward said second leg.

2. A retriever as claimed in claim 1, wherein the free ends of said arms, when said other arm of said pair is drawn nearer said second leg, are on a line lying between the lever fulcrum and the guiding passage; a ball having a diameter greater than said passage and secured on said pull-line at a distance such, from the end of the pull-line connected to said lever, that in inoperative position when the hooked end of said lever is rotated toward said first leg, the line joining the two free ends of said lever is on the side of said fulcrum facing the pull-line between the connected end thereof and said ball.

3. A retriever as claimed in claim 1, including a guide line for guiding said body as it sinks and connected to said second leg, said guide line also serving as a pull-line to retrieve said weighted body.

4. A retriever as claimed in claim 1, wherein said weighted body is a pear-shaped member including a second U-shaped part connected to the aforesaid U-shaped part; said second U-shaped part having a transverse slot to allow passage of a fish line.

References Cited by the Examiner

UNITED STATES PATENTS

| | | | |
|---|---|---|---|
| 520,052 | 5/1894 | Hirschmann | 43—17.2 |
| 893,173 | 7/1908 | Kunze | 43—17.2 |
| 1,042,630 | 10/1912 | Wetmore | 43—17.2 |
| 2,482,716 | 9/1949 | Noelcke | 43—17.2 |

SAMUEL KOREN, *Primary Examiner.*

ALDRICH F. MEDBERY, *Examiner.*

WARNER H. CAMP, *Assistant Examiner.*